—o— FOR A PRODUCT OF THIS INVENTION Fe-8%Cr-0.5%C
—x— FOR Ni-Cr CAST IRON
—△— FOR A DICE STEEL CLASS I

PORES  MATRIX (NEEDLE
       STRUCTURE)
MAGNIFYING FACTOR 150

(CONVENTIONAL METHOD)

MINUTE     MATRIX (NEEDLE
PORES      STRUCTURE)
MAGNIFYING FACTOR 450

(ACCORDING TO THIS INVENTION)

CHROMIUM CONCENTRATION IN
SPECIMEN A SHOWN BY X-RAY
MICROANALYZER

MICROSCOPIC STRUCTURE
OF SPECIMEN A

INVENTOR
KENYA MOTOYOSHI

CHROMIUM CONCENTRATION
IN SPECIMEN B SHOWN BY
X-RAY MICROANALYZER

CHROMIUM CONCENTRATION
IN SPECIMEN B

MAGNIFYING FACTOR 850

CHROMIUM CONCENTRATION IN
SPECIMEN B

INVENTOR.
KENYA MOTOYOSHI

United States Patent Office 3,698,877
Patented Oct. 17, 1972

3,698,877
SINTERED CHROMIUM STEEL AND PROCESS FOR
THE PREPARATION THEREOF
Kenya Motoyoshi, Hyogo, Japan, assignor to Sumitomo
Electric Industries, Ltd., Osaka, Japan
Filed Dec. 15, 1969, Ser. No. 884,897
Claims priority, application Japan, Dec. 13, 1968,
43/91,872; Mar. 12, 1969, 44/19,150; Nov. 4,
1969, 44/88,631
Int. Cl. B22f 3/12
U.S. Cl. 29—182
16 Claims

ABSTRACT OF THE DISCLOSURE

Sintered chromium steel of high density, high strength, and high heat resistance is obtained by mixing an intermetallic compound FeCr (in the so-called sigma phase), pulverized to less than 10 microns, with iron powder and carbon powder, and if desired with other alloy powders, and by molding and sintering the thus obtained mixture.

BACKGROUND OF THE INVENTION (1) Field of the invention

This invention relates to production of high density sintered materials containing chromium and carbon.

Powder metallurgy, wherein metallic powders are compressed, molded, and sintered for obtaining machine parts, is employed in an increasing number of technologies, and various kinds of materials are now produced by this method. With ferrous materials, Fe-C, Fe-Cu-C, Fe-Ni-C, and Fe-Ni-Cu-C series are the principal compositions. For rather special applications, there are stainless steels, such as Fe-Cr, Fe-Cr-Ni series, and electromagnetic materials, such as Fe-P and Fe-Si series. The density, compositions of various alloys, and the heat treatment used are varied in accordance with the requirements of the application so that the mechanical strength and physical nature of the material are varied suitably. Furthermore, for the purpose of improving the mechanical strength of a sintered material, addition of Mn, Mo, W, or else has been attempted, and, with the progress of the powder metallurgy techniques, various fields of application will be cultivated. For instance, the application of sintered materials is expanding from the conventional light static load to heavy dynamic load and also to those applications requiring heat resistance and wear resistance characteristics.

For satisfactory results in these applications, obtaining a heavier density of the sintered materials or obtaining various alloy steels of improved strength and nature have been attempted. For this purpose, various iron powders were developed and methods of compression for obtaining higher densities were found.

However, chromium steel, which has a high tension and a high heat resistivity and is widely employed in machine construction, has not yet been sintered by conventional powder metallurgy techniques. These attempts for obtaining sintered chromium steel did not produce a material of higher density than 6.8 g./cc. In the conventional technique, the method for obtaining high density sintered materials comprises the steps of recompressing the sintered material in a die and crushing the pores or gaps present in the structure of the sintered material.

Sintered chromium steels of the Fe-Cr-C series alloys, however, are strongly resistive to deformation and the above described recompression method cannot be applied. Thus, when a sintered chromium steel of more than 6.8 g./cc. is desired, a method similar to the method employed for obtaining sintered stainless steel is employed. That is, a sintered Fe-Cr material is further subjected to a carburizing treatment. However, if such a method is employed, the carbon concentration between the surface and in the central portion of the product is different and a uniform alloy cannot be obtained. Furthermore, the carburizing treatment is extremely time consuming.

Therefore, the principal object of the present invention is to provide a high density sintered chromium steel which has a tensile strength and which has high heat and wear resistivity.

Another object of the present invention is to provide a sintered chromium steel (Fe-Cr-C) having a density of greater than 7.2 g./cc.

Still another object of the present invention is to provide a novel method for obtaining a sintered chromium steel having a density of greater than 7.2 g./cc.

SUMMARY OF THE INVENTION

These and other objects of the present invention can be achieved by preparing an intermetallic compound, FeCr, which is very brittle and which exists in a phase generally called the sigma phase in the phase diagram of Fe-Cr series alloy, pulverizing the thus prepared compound to less than 10 microns, mixing the pulverized intermetallic compound with fine powders of Fe and C, and molding and sintering the mixed powders in the conventional manner.

More particularly, the intermetallic compound FeCr in the sigma phase (hereinafter called the sigma compound) is initially obtained by annealing a Fe-Cr series alloy containing about 40 to 60% Cr by weight at a temperature ranging from 600° C. to 800° C. The thus obtained sigma compound is then pulverized into a fine powder grain size of less than 10 microns, and the pulverized sigma compound (hereinafter called the sigma powder) is mixed with a suitable amount of Fe powder and carbon powder and molded and sintered to obtain a sintered chromium steel having a density of greater than 7.2 g./cc.

The principle, nature, and utility of the present invention will be more clearly understood from the following detailed description when read in conjunction with the accompanying drawings.

DETAILED DESCRIPTION OF THE INVENTION

Conventional methods for producing Fe-Cr-C series sintered materials will at first be described in detail. These materials have been produced by either one of the following methods:

(1) Mixing method: Fe, Cr, and C powders are mixed together at a desired ratio, molded under compression, and then sintered. In this method, uniformity in the alloyed structure is difficult to obtain due to the oxidation of the Cr during the sintering process and to the creation of chromium carbide by the reaction of Cr and C, so that a sintered material of high density cannot be obtained.

(2) Alloy powder method: An alloy powder of Fe-Cr-C of a desired composition is employed as the starting material, and the powder is thereafter compression molded and sintered. The disadvantage of this method is the low compressibility of the alloy powder and in the inferior progress to a high density during the sintering process.

Another version of this method employs an alloy powder of Fe-Cr which is mixed with C powder at a desired ratio. However, difficulty in compressibility still exists in this method. In addition, insufficient diffusion of C takes place resulting in a non-uniform structure, and the result is that the desired uniform structure of a high density cannot be obtained.

(3) Ferro-chromium powder, employed in the conventional molten steel production process is utilized, and the powder is mixed with Fe powder and C powder and molded and sintered. Although the ferro-chromium powder contains about 60 to 65% Cr by weight, its structure is in the alpha region. The alpha region is sticky in nature so that a fine powder of the material is difficult to obtain. As a result, when this powder is mixed with Fe powder and C powder and sintered, a non-uniform structure is obtained because of the insufficient alloying action, and as a result a low density is obtained. The maximum density obtained by this method is about 6.7 g./cc. and the mechanical strength of the product is low. Thus, the products are no more suitable than conventional ferrous sintered materials.

In contrast to the above described conventional methods of producing sintered chromium steel, the method according to the present invention employs an intermetallic compound of Fe-Cr in the sigma region which is brittle and easily pulverized by any conventional mechanical grinding techniques. The sintering process is described as follows.

Figure 1:
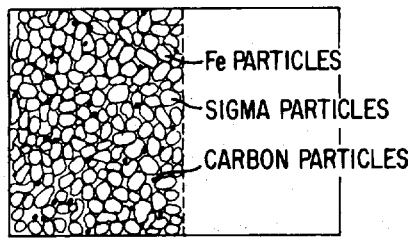
FIGS. 1, 2 and 3 are diagrams showing, respectively, the structures of sintered chromium steel according to the present invention.
Figure 2:
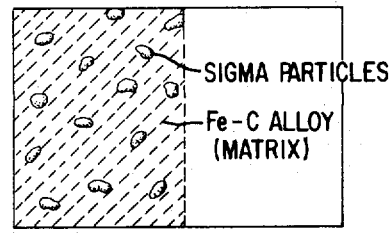
Figure 3:
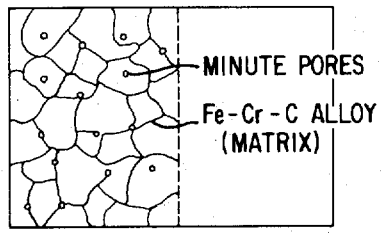

Prior to sintering, the molded substance consists of a mixture of the sigma powder, Fe powder, and C powder as shown in FIG. 1. The molded substance is heat treated in an atmosphere of hydrogen so that the sintering phenomenon occurs due to the diffusion of Fe, Cr and C atoms. FIG. 2 shows the structure of the molded substance after being sintered at 1200° C. for one hour. The matrix consists of a Fe-C alloy, with sigma powder FeCr distributed within this matrix. The structure obtained after being sintered at 1300° C. for one hour is shown in FIG. 3. This figure shows that the sigma powder has vanished and that a uniform structure containing crystalline matrices of Fe-Cr-C alloy is obtained. The reason for the disappearance of the sigma powder is not yet understood, while not desiring to be bound it is believed that the oxidized layer on the surface of the sigma powder is broken by the expanded volume at the time the sigma phase is transformed to the alpha phase and the metallic atoms in the sigma region contact the matrices surrounding the sigma region. Furthermore, due to diffusion of Cr atoms into the Fe, the percentage of Cr in the matrices increases gradually, whereby the matrices are transferred from the gamma phase to the alpha phase. The increase in volume at this time compresses the pores or gaps within the structure and the density in increased in a short period.

It should be noted that the particle size of the sigma powder employed in the Fe-Cr alloy does not affect the density of the sintered substance and a high density material having less pores can be obtained. However, when C is added in addition to the two components, the particle size of the sigma powder affects the density of the sintered product to a great extent. More specifically, in the former case, mutual diffusion takes place between the portion where the sigma powder existed and the matrix portion, whereby a high density product having equal concentrations of Fe and Cr is obtained. However, in the latter case, if the particle size of the sigma powder is about −325 mesh (an average grain diameter of about 20 microns), the portions corresponding to the vanished portions of the sigma phase are distributed in the sintered structure. Since these portions tend to become pores or gaps within the structure, the maximum density obtainable in the case cannot exceed 6.8 g./cc.

However, if the particle size of the sigma powder is smaller than that conventionally employed, i.e., an average particle size of less than 10 microns, the density of the Fe-Cr-C sintered material can be increased to greater than 7.2 g./cc., and only a few pores, minimal in size, remain in the structure of the sintered material.

This will be explained more fully as follows: Sigma powder of about −325 mesh (an average grain diameter of about 20 microns), Fe powder, C powder, and a suitable amount of lubricating agent such as stearic acid or zinc stearate, are mixed together so that the component ratio is obtained. The mixture is then subjected to simultaneous mixing and grinding, for instance, using a vibrating mill or a ball mill. The sigma powder is not only further pulverized to an average grain diameter of less than 10 microns, but also the Fe powder, C powder, and the sigma powder are rigidly joined together. Simultaneously, the lubricating agent covers the surfaces of the powders and serves to prevent exothermic oxidation of these powders due to the increase of the specific surface area. When these powders are compressively molded and sintered, diffusion of the Fe, Cr, and C atoms occurs and a fine structure of the sintered substance can be obtained.

In contrast, if a sigma powder of −325 mesh (an average grain diameter of approximately 20 microns) and Fe and C powders of −325 mesh are mixed together in a conventional mixing machine, such as V-type mixer, Lodige mixer, or double cone blender, pulverization of the sigma powder to less than 10 microns does not result and the rigid joining of these powders does not take place, whereby when the thus mixed powders are compressively molded and sintered, minimization of the pores does not occur, as was the case of the preceding example, and the maximum density cannot exceed 6.8 g./cc.

As described above, in the production of the sintered Fe-Cr-C alloy utilizing the sigma powder, the particle size of the sigma powder and the mixing method directly influence the ultimate density of the sintered alloy. A high density sintered material cannot be obtained by the conventional powder metallurgy wherein approximately −325 mesh grain sized powders are simply mixed by means of a mechanical mixing machine. When the sigma powder is further pulverized by a mixing and grinding method as described in the present invention, a sintered chromium steel of high density can be obtained initially.

Furthermore, in the sintered alloy according to the present invention, alloying elements such as Ni, Mo, Mn, Si, W, Al, Ti, V, Cu, and the like can be added, as in the case of the conventional Fe-Cr-C series alloy, for the purpose of improving the mechanical and physical properties product.

Another feature of the sintered alloy of the present invention is that the self-hardening nature of Cr is revealed. Since the Cr element is satisfactorily diffused at the time of sintering for obtaining a uniform alloy a heat hardened structure can be obtained merely by cooling the sintered alloy from its sintering temperature to result in obtaining a sintered material of a high strength.

In order to improve further the mechanical and physical properties of the sintered chromium alloy, the sintered alloy can be subjected to a cold forging or a hot forging process. In this way, the density of the sintered chromium steel can be increased additionally or the structure thereof can be refined further. To improve the dimensional accuracy, the sintered alloy can be subjected to a coating or sizing treatment as with other conventionally sintered materials. The invention will be further explained with respect to the examples given hereinafter. All percentages are by weight unless otherwise indicated.

EXAMPLE 1

Powders of following compositions (Fe-8% Cr-0.5% C) were prepared by two methods, one being a simple and conventional mechanical mixing method and the other being the mixing and grinding method of the present invention, wherein the sigma powder was further pulverized to a particle size of less than 10 microns.

| | Percent |
|---|---|
| Sigma powder (40% Cr-Fe) | 20 |
| Fe powder (−325 mesh) | 79.5 |
| Carbon powder (1 to 2 microns) | 0.5 |

The mixed powders were compressed at 5 t./cm.$^2$ and the metal compacts were sintered in a high purity atmosphere at 1300° C. for one hour. The characteristics of the sintered materials prepared by the two methods described above are shown in Table 1 below.

TABLE 1

| Method | Specific gravity of— Molded substance | Sintered alloy | Tensile strength (kg./mm.$^2$) | Elongation, percent | Rockwell C hardness |
|---|---|---|---|---|---|
| Conventional | 6.20 | 6.43 | 69.5 | 1.0 | 12 |
| Invention | 6.17 | 7.42 | 104.3 | 2.0 | 33 |

Figure 6:
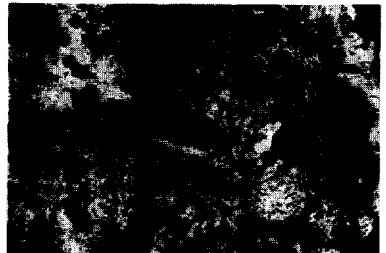
FIG. 6 is a photomicrograph showing the microscopic structure of a chromium steel prepared according to the conventional method.
Figure 7:
FIGS. 7, 8, 9, 10, 11 and 12 are photomicrographs showing the microscopic structure of the chromium steel prepared according to the present invention.

On examination of the structure of the sintered chromium steel, it was found that the conventional method resulted in comparatively large pores, shown in FIG. 6, while the method according to the present invention resulted in only minute pores, as shown in FIG. 7. The former was of a coarse martensite and the latter was of refined martensite. This difference was due to the difference in particle size of the sigma powders in either of the cases.

EXAMPLE 2

Mixed powders having the following compositions were prepared employing No. 2 ferro-chromium powder (63% Cr), commercially available, and sigma powder (40% Cr) so that a resultant composition of Fe-8% Cr-0.5% C was obtained.

A specimen: Percent
Ferro-chromium powder (−100 mesh) _____ 12.7
Fe powder (−100 mesh) _____ 86.8
Carbon powder (from 1 to 2 microns) _____ 0.5

B specimen:
Sigma powder (less than 10 microns) _____ 20.0
Fe powder (−100 mesh) _____ 79.5
Carbon powder (from 1 to 2 microns) _____ 0.5

Each of A and B specimens were mixed and ground in a vibrating mill to the extent that the sigma powder contained therein was ground to a grain size of less than 10 microns, and so that both of the specimens were treated exactly in the same manner. The specimens A and B were then compressed in metal molds at a pressure of 5 t./cm.$^2$ and the thus molded mixtures were then sintered in a highly pure atmosphere at 1300° C. for one hour. The characteristics of the sintered alloys obtained from the two specimens are shown in Table 2 below.

TABLE 2

| Specimen | Specific gravity of— Molded mixture | Sintered alloy | Tensile strength (kg./mm.$^2$) | Elongation, percent | Rockwell C hardness |
|---|---|---|---|---|---|
| A | 6.5 | 6.7 | 65 | 0.5 | 10 |
| B* | 6.3 | 7.5 | 92 | 3.5 | 60 |

*Marked specimen is in accordance with this invention.

Figure 8:
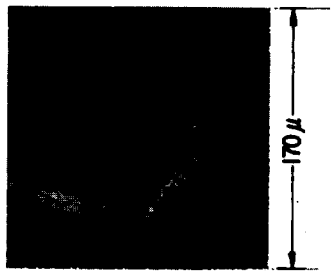
Figure 9:
Figure 10:
Figure 11:

The micro structures of the two kinds of sintered materials are shown in FIGS. 8, 9, 10, and 11. FIG. 8 shows the Cr concentration in specimen A, employing an X-ray microanalyzer, and FIG. 9 shows an ordinary photomicroscopic structure of specimen A. From these pictures, segregation of Cr apparently occurs and also ordinary pearite+ferrite structure is observed. FIG. 10 shows the Cr concentration in specimen B, prepared according to the present invention, obtained by the X-ray microanalyzer. From this picture, it is apparent that Cr elements are distributed uniformly within the specimen. FIG. 11 shows a microscopic picture of specimen B and reveals that specimen B consists of a tight structure of martensite with some small globular poles distributed therein. Because of this structure, the density and the strength of the sintered specimen prepared according to the present invention are of higher values.

EXAMPLE 3

Employing sigma powder (of −325 mesh) and Fe powder, a mixture of Fe-5% Cr is prepared. Two additional mixtures are prepared by adding C powder to obtain mixtures containing 0.5% C and 1.0% C respectively. This resulted in three samples, a Fe-5% Cr sample mixture and the two mixtures containing 0.5% and 1.0% of C powder. To these mixtures further was added 1.0% of a lubricating agent such as zinc stearate. The mixtures were then mixed and ground in a vibrating mill until the sigma powder contained therein was ground to a grain size of less than 10 microns. The mixed and ground specimen were then compressed in metal molds at 5 t./cm.$^2$ pressure and heated in a high purity atmosphere in a temperature range from 1,250° C. to 1,300° C. for one hour. Three kinds of sintered chromium steels according to the present invention were obtained. The characteristics of these materials are compared with the characteristics of conventional ferrous sintered materials, and are shown in Table 3.

TABLE 3

| Composition | Density (g./cc.) | Tensile strength (kg./mm.$^2$) | Elongation, percent | Rockwell hardness | Method of production |
|---|---|---|---|---|---|
| Fe, 5% Cr | 7.52 | 67.6 | 5.0 | RC 50 | According to this invention. |
| Fe, 5% Cr, 0.5% C | 7.47 | 91.8 | 3.5 | RC 60 | |
| Fe, 5% Cr, 1.0% C | 7.42 | 116.4 | 2.2 | RC 61 | |
| Fe, 2% Cu, 1.0% C | 6.82 | 46.0 | 2.0 | RB 85 | One compression and one sinter. |
| Fe, 4% Cu, 2% Ni-1 C | 6.87 | 60.0 | 3.0 | RB 83 | |
| Fe, 2% Cu | 7.20 | 35.0 | 12.0 | RB 55 | Two times compressions and two sinterings. |
| Fe, 3% Cu, 2% Ni | 7.20 | 42.0 | 6.0 | RB 64 | |
| Fe, 3% Cu, 5% Ni | 7.20 | 65.0 | 6.5 | RB 82 | |
| Fe, 3% Ni, 0.5% Mn, 0.5% C | 7.70 | 70.0 | 5.0 | RB 80 | Sintered material is hot forged. |

As is apparent from the Table 3, the specimens prepared according to the present invention have higher mechanical strengths than the conventional sintered material subjected to one compression and one sintering in a manner similar to that employed in this invention. The three kinds of specimen prepared according to the present invention show higher tensile strengths, hardnesses, and densities than the conventional sintered materials sintered two times. More specifically, the specimen according to the present invention have equivalent characteristics to the forged sintered material which is widely used nowadays. The high hardness of the sintered material according to the present invention is due to the self-hardening nature of Cr which causes a martensite heat hardening structure when the sintered material is cooled from the sintering temperature. In conventional sintered parts, this structure has been obtained through a separate heat-hardening process. The above described nature of the sintered material is particularly advantageous when the material is employed as structural members where wear-resistance is strongly demanded. Furthermore, the sintered chromium steel according to the present invention can be changed in its structural compositions or characteristics by varying the cooling rate of the sintered chromium steel or by subjecting the sintered chromium steel to a heat treatment such as an annealing process, as in the case of the chromium steel obtained by ordinary melting process.

EXAMPLE 4

Sigma powder (of −325 mesh), Fe powder (of −100 mesh), and carbon powder of one to two microns are mixed at following ratio and ground in a vibrating mill until the grain size of the sigma powder is reduced to less than 10 mcrons, and a mtxture of Fe-2% Cr-1.5% C is obtained.

|  | Percent |
|---|---|
| Sigma powder (40% Cr) | 5 |
| Fe powder (−100 mesh) | 93.5 |
| C powder (1 to 2 microns) | 1.5 |

Figure 12:

The mixed powder is compressively molded in a metal mold at a pressure of 5 ft./cm.$^2$, and the thus molded mixture is heated in a high purity atmosphere at 1,250° C. for one hour. The characteristics of the sintered material thus obtained are as follows:

Density of the sintered material _____ 7.40 g./cc.
Hardness of the sintered material _____ Rockwell B95.
Structure of the sintered material _____ Minute carbide grains dispersing structure, as shown in FIG. 12.

The sintered material is again heated in a non-oxidizing atmosphere at a temperature of from 950° C. to 1,100° C., and thereafter forged in a hot condition. The characteristics of the thus obtained material are as follows:

Density of forged material _____ 7.8 g./cc.
Hardness of forged material ____ Rockwell B110 and Rockwell C35.
Structure of forged material ____ Minute carbide grains dispersing structure.

As is apparent from the above description, the density and hardness of the products can be increased by forging the sintered material according to the present invention in a hot condition. It should be noted that when a sintered material having a coarse structure is thus forged, the structure is broken into a minute structure, having quite similar characteristics to those produced by the conventional melting and forging method.

As described in all of the above example, according to the present invention, a mixture of the sigma powder, Fe powder, and C powder is mixed and ground simultaneously so that the grain size of the sigma powder is further minimized and the contact between each powder is further improved. As a result, high density sintered chromium steel which is heretofore considered impossbile to be obtained by sintering can be easily produced. The characteristics of the thus obtained sintered chromium steel are far superior to those of the conventionally produced sintered ferrous materials, employing conventional powder metallurgy, and are equivalent to those of the sintered materials thereafter forged in a hot condition. Furthermore, it is also made apparent that the sintered chromium steel according to the present invention can be additionally forged in a hot condition resulting in characteristics equivalent to those of the ordinary chromium steel produced by the melting process.

The mixing rate of the sigma powder into the Fe and C powders will be considered now. When the content of the sigma powder is represented by the content of Cr in percentage, when Cr is less than 0.5%, no appreciable effect can be observed. When the percentage of Cr exceeds 20%, compressibility of the mixed powder is decreased and no sufficiently larger strength can be obtained. Accordingly, the sigma powder should be contained so that a Cr percentage of from 0.5 to 20% thereby results.

The mixing and grinding condition is varied by the construction of the mixing and grinding machine, the charged amount of the powders, the size and number of the balls, the rotating speed of the machine, and the time of operation. The relations between the grinding hours, grain size of the sigma powder, and the characteristics of the sintered product are shown in the following table.

| Grinding, hours | Grain size of the sigma powder average ($\mu$) | Specific gravity of— | | Rockwell hardness |
|---|---|---|---|---|
|  |  | Molded powder | Sintered alloy |  |
| 0 (mechanical mixing) | 20 | 6.74 | 6.44 | C 10 |
| 3 | 15 | 6.66 | 7.01 | C 15 |
| 5 | 12 | 6.41 | 7.20 | C 23 |
| 10 | 10 | 6.34 | 7.40 | C 33 |

NOTE.—For the above composition: Fe, 5.0% Cr, 0.5% C. Size of powders: Fe-100 mesh; Fe-40 Cr 20$\mu$; C powder 1 to 2$\mu$. Molding pressure: 5 t./cm.$^2$. Sintering: at 1,250° C. one hour.

From the above results, the density of the sintered product is increased by a mixing and grinding operation by which a grain size of the sigma powder of about 15$\mu$ is obtained. When this operation is continued for ten hours, the grain size of the sigma powder is reduced to 10$\mu$ and the sintered products obtained from such a mixture acquires a high density of 7.40. From these results, it is made apparent that a mixing and grinding operation of a minimum of three hours (grain size of the sigma powder becomes less than 15$\mu$) is necessary.

Similar to the use of ordinary chromium steel, the fields where the sintered chromium steel can be applied, can be classified by the percentage of Cr as follows:

0.5 to 5% Cr: Machine structure and tool steel requiring wear resistance.
5 to 10% Cr: Machine structure steel requiring wear resistance and heat resistance.
10 to 20% Cr: Structural steel requiring corrosion-resistance, oxidation resistance, and heat resistant natures.
20 to 40% Cr: Construction material requiring heat resistance and oxidation resistance characteristics at high temperature.

The percentage of C obtained simultaneously with the above-described Cr content is in a range of from 0.1 to 2.5%, with the contents of Cr and C being selected depending on the application.

One use of the sintered chromium steel according to the present invention is by application of the sintered steel to a seat ring of a valve employed in an automobile engine requiring high heat resistance and wear resistance is described in the following example.

EXAMPLE 5

Figure 4:
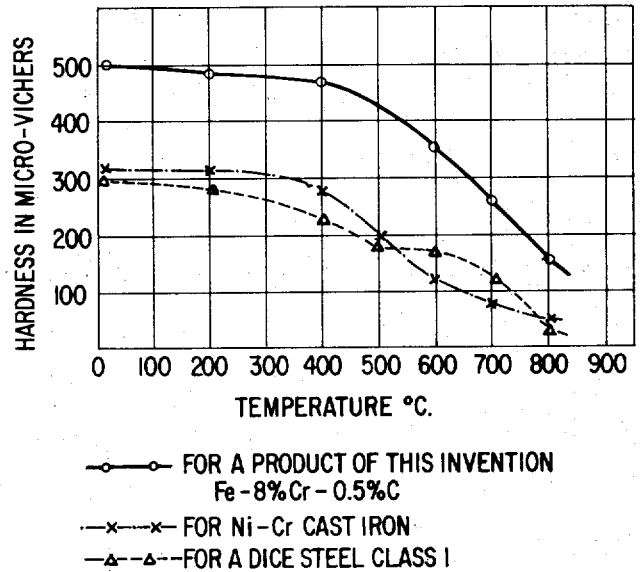
FIG. 4 is a graphical representation of the high temperature hardness characteristics, wherein the sintered chromium steel prepared according to this invention applied in a valve-seat ring is compared with that of the conventional material.

A sintered chromium steel (Fe-8% Cr-0.5% C.) prepared according to the present invention, a Ni-Cr cast iron conventionally used as the seat ring of a valve, and a conventional dice steel (SKD1), were heated in vacuum of about 10$^{-2}$ mm. Hg, and their hardnesses measured in the temperature range of from a room temperature to 800° C. The results are shown in FIG. 4. As is apparent from this figure, the conventional materials showed significant reduction of the hardness at temperatures above 500° C. However, the sintered material according to the present invention showed only a slight reduction in the hardness, and the value, even so, was still considerably higher than the values of conventional materials. Since the seat ring, especially in the exhaust side of an engine, is always exposed to a high temperature of more than 500° C., the sintered material according to the present invention is much improved in this respect than the conventional materials. More specifically, the density of the sintered material according to the conventional powder metallurgy is at most 6.8 g./cc. as described in Example 2, and a number of pores are mutually interconnected within the structure. For this reason, if the sintered material is employed for the seat ring, the gas under pressure as in the compression cycle of the piston engine partly leaks out of the engine through these pores, resulting in disadvantageous features such as a reduction of the output and the creation of problems caused by the leaked-out gas. Accordingly, the conventional sintered materials could not be employed practically for the seat ring in the engine, and it can be said that a seat ring is produced for the first time utilizing the sintered material in accordance with the present invention.

Figure 5:
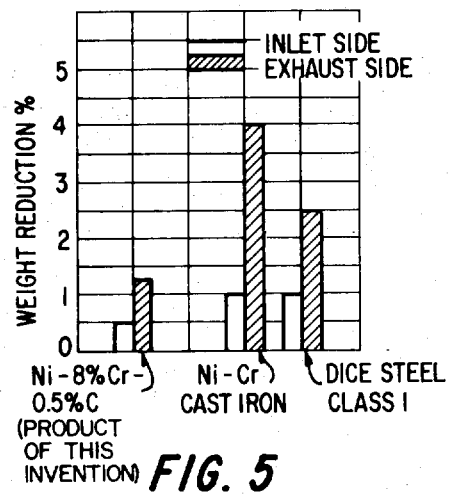
FIG. 5 is another graphical representation of the test results obtained when the sintered material prepared according to the present invention is applied to a practical engine.

The sintered material according to the present invention was employed in an engine as the seat rings, and subjected to a two hundred hour bench test. The weights of the seat rings before and after the bench test were measured for evaluating the heat-resistant and wear-resistant characteristics of the sintered material. The results are shown in FIG. 5. As is apparent from the test results, the amount of wear of the seat rings, consisting of the sintered material of this invention, is remarkably less than the amount of wear obtained with seat rings made of the conventional materials. The seat rings made of the conventional materials showed that surfaces of the seat rings with the valves were subjected to considerable wear causing gas leakage in the compression cycle through the gaps between the seat ring and the valve resulting in a reduction of the output of the engine. However, with seat rings employing the sintered material of this invention, deformation of the seat rings due to wear was not observed and practically no problem found with seat rings made of the sintered material according to the present invention resulted.

As still another application of the present invention, an example of obtaining a high speed steel requiring an elevated hardness at high temperature with the addition of other metal elements is described below.

EXAMPLE 6

Employing a sigma powder having particle size of less than 10 microns, a mixed powder of high speed steel of 18–4–1 type was produced in accordance with the following composition.

|  | Percent |
|---|---|
| Sigma powder (40% Cr-Fe) | 10.0 |
| Fe powder (—325 mesh) | 69.2 |
| W powder (average particle size 2 to 3μ) | 18.0 |
| Fe-V alloy powder (50% V-Fe, —325 mesh) | 2.0 |
| Carbon powder (average particle size 1 to 2μ) | 0.8 |

The above described mixture was compressed in a metal mold under a pressure of 5 t./cm.$^2$, and molded material was sintered at a temperature of 1300° C. in a protective atmosphere for one hour.

The specific gravity of the thus sintered material was 7.90, and the Rockwell C Hardness was 60. The microscopic structure of the sintered material was different from that of an ordinary high speed steel obtained by the melting method, and composite carbides dispersed in austenite ground mixed with martensites was seen. The dispersion of the composite carbides was extremely even and of fine structure. Furthermore, the residual pores or gaps can be easily eliminated by subjecting the sintered material to an additional forging or drawing treatment in hot condition to obtain a tight structure. Quenching, tempering, or annealing can also be carried out as in the case of the ordinary high steel and the sintered material thus heat treated can be employed in various fields of cutting tools.

EXAMPLE 7

A mixed powder of 6–5–2 type high speed steel was produced employing fine sigma powder. The composition in this case was as follows:

|  | Percent |
|---|---|
| Sigma powder (40% Cr-Fe) | 10.0 |
| Fe powder (—325 mesh) | 69.0 |
| W powder (average particle size 2 to 8μ) | 6.0 |
| Fe-Mo powder (50% Mo-Fe, —325 mesh) | 10.0 |
| Fe-V powder (50% V-Fe, —325 mesh) | 4.0 |
| Carbon powder (average particle size 1 to 2μ) | 1.0 |

The mixed powder is statically compressed in a metal mold under a pressure of 3 t./cm.$^2$, and a molded substance of 100 x 400 mm. is obtained. The molded substance is then sintered in a protective atmosphere at a temperature of 1250° C. for one hour, and a sintered material of a specific gravity of 8.0 and a Rockwell C Hardness of 61 was obtained. The microscopic structure and the treatment thereafter are similar to the above described Example 6.

As is apparent from the above descriptions, the sintered material according to the invention is a high density chromium steel which has been considered difficult to produce by conventional powder metallurgy, and the application range can be expanded as for the ordinary chromium steel by varying the percentages of the Cr and C. Furthermore, the sintered material can be improved in its characteristics by being forged in a hot or cold condition and the mechanical and physical properties of the sintered material can be adjusted by adding various alloying elements such as Ni, Mo, Nb, Si, W, Al, Ti, V, Cu, and the like, as in the case of the conventional chromium steel produced by the melting method. The sintered material according to the invention may also be heat treated, e.g., heat hardening or of annealing.

What is claimed is:

1. A high density sintered chromium steel comprising a molded and sintered mixed powder comprising a minutely pulverized powder of an intermetallic compound of iron and chromium mixed with a carbon powder and an iron powder, said intermetallic compound being in the sigma phase prior to sintering and having an average particle size of less than 10 microns, the density of said high density sintered chromium steel being greater than 7.2 g./cc., said sigma phase having disappeared from said intermetallic compound following sintering, and said chromium steel containing 0.1 to 2.5% carbon.

2. A high density sintered chromium steel comprising a molded and sintered mixed powder comprising a minutely pulverized powder of an intermetallic compound of iron and chromium mixed with a carbon powder, an iron powder, and powders of other alloying elements, said intermetallic compound being in the sigma phase prior to sintering and having an average particle size of less than 10 microns, the density of said high density sintered chromium steel being greater than 7.2 g./cc., said sigma phase having disappeared from said intermetallic compound following sintering, and said chromium steel containing 0.1 to 2.5% carbon.

3. A cold worked high density sintered steel as set forth in claim 1.

4. A hot worked high density sintered steel as set forth in claim 1.

5. A cold worked high density sintered chromium steel as set forth in claim 2.

6. A hot worked high density sintered chromium steel as set forth in claim 2.

7. The high density sintered steel as set forth in claim 1, wherein said intermetallic compound comprises from about 40–60% by weight chromium.

8. The high density sintered steel as set forth in claim 1, wherein the amount of intermetallic compound is such that 0.5–20% by weight chromium is present in said high density sintered steel.

9. The high density sintered steel as set forth in claim 1, wherein said steel has a density greater than 7.2 g./cc.

10. The high density sintered steel as set forth in claim 2, wherein said intermetallic compound comprises from about 40–60% by weight chromium.

11. The high density sintered steel as set forth in claim 2, wherein the amount of intermetallic compound is such that 0.5–20% by weight chromium is present in said high density sintered steel.

12. The high density sintered steel as set forth in claim 2, wherein said steel has a density greater than 7.2 g./cc.

13. The high density sintered chromium steel as set forth in claim 2, wherein said alloying elements are selected from the group consisting of nickel, molybdenum, manganese, silicon, tungsten, aluminum, titanium, vanadium, and copper.

14. A process for the preparation of a high density chromium steel containing 0.1 to 2.5% carbon comprising pulverizing a mixture comprising a powder of an intermetallic compound of iron and chromium and iron and carbon powders to an average particle size of less than 10 microns by mixing and grinding said powders, molding said mixture under pressure, and sintering said mixture, said intermetallic compound being in the sigma phase.

15. The process of claim 14 wherein the process contains the additional step of cold working the sintered material.

16. The process of claim 14 wherein the process contains the additional step of hot working the sintered material.

References Cited

UNITED STATES PATENTS

| | | | |
|---|---|---|---|
| 2,920,958 | 1/1960 | Bergh | 75—200 |
| 3,126,279 | 3/1964 | Bergh | 75—200 |
| 3,459,542 | 8/1969 | Knight | 75—200 |
| 2,834,666 | 5/1958 | Bergh et al. | 148—126 |

CARL D. QUARFORTH, Primary Examiner

B. H. HUNT, Assistant Examiner

U.S. Cl. X.R.

75—211, 213; 29—420.5